(12) United States Patent
Ishihara et al.

(10) Patent No.: US 9,295,950 B2
(45) Date of Patent: Mar. 29, 2016

(54) MICROPOROUS MEMBRANES, METHODS FOR MAKING SUCH MEMBRANES, AND THE USE OF SUCH MEMBRANES AS BATTERY SEPARATOR FILM

(75) Inventors: Takeshi Ishihara, Kawagoe (JP); Satoshi Miyaoka, Nasushiobara (JP); Koichi Kono, Asaka (JP); Donna J. Crowther, Seabrook, TX (US); Patrick Brant, Seabrook, TX (US)

(73) Assignee: Toray Battery Separator Film Co., Ltd. (JP)

( * ) Notice: Subject to any disclaimer, the term of this patent is extended or adjusted under 35 U.S.C. 154(b) by 0 days.

(21) Appl. No.: 13/260,658

(22) PCT Filed: Mar. 5, 2010

(86) PCT No.: PCT/US2010/026431
§ 371 (c)(1),
(2), (4) Date: Sep. 27, 2011

(87) PCT Pub. No.: WO2010/114676
PCT Pub. Date: Oct. 7, 2010

(65) Prior Publication Data
US 2012/0034519 A1     Feb. 9, 2012

Related U.S. Application Data

(60) Provisional application No. 61/164,824, filed on Mar. 30, 2009, provisional application No. 61/164,827, filed on Mar. 30, 2009, provisional application No. 61/164,833, filed on Mar. 30, 2009, provisional (Continued)

(30) Foreign Application Priority Data

| May 25, 2009 | (EP) | 09160964 |
| May 25, 2009 | (EP) | 09160965 |
| May 25, 2009 | (EP) | 09160966 |
| May 25, 2009 | (EP) | 09160967 |
| Jun. 25, 2009 | (EP) | 09163698 |
| Aug. 19, 2009 | (EP) | 09168194 |

(51) Int. Cl.
*H01M 2/14* (2006.01)
*B01D 71/26* (2006.01)
(Continued)

(52) U.S. Cl.
CPC ............... *B01D 71/26* (2013.01); *B01D 71/76* (2013.01); *B29C 47/00* (2013.01); *B32B 27/32* (2013.01); *H01M 2/14* (2013.01); *H01M 2/16* (2013.01); *H01M 2/164* (2013.01); *H01M 2/1653* (2013.01)

(58) Field of Classification Search
CPC ........ B01D 71/26; B01D 71/76; B29C 47/00; B32B 27/32; H01M 2/14; H01M 2/16; H01M 2/164; H01M 2/1653
USPC .................. 429/129, 132, 135, 141, 145, 309, 429/231.95, 246, 247
See application file for complete search history.

(56) References Cited

U.S. PATENT DOCUMENTS

| 5,084,534 A | 1/1992 | Welborn, Jr. et al. |
| 6,054,498 A * | 4/2000 | Hasegawa ........... H01M 2/1653 429/247 |

(Continued)

FOREIGN PATENT DOCUMENTS

| EP | 1 870 430 | 12/2007 |
| JP | 60-23954 A | 2/1985 |

(Continued)

OTHER PUBLICATIONS

Sun, T. et al., "Effect of Short Chain Branching on the Coil Dimensions of Polyolefins in Dilute Solution," *Macromolecules*, 2001, vol. 34, No. 19, pp. 6812-6820 (1 page Abstract).

(Continued)

*Primary Examiner* — Patrick Ryan
*Assistant Examiner* — Ben Lewis
(74) *Attorney, Agent, or Firm* — DLA Piper LLP

(57) ABSTRACT

The invention relates to microporous membranes comprising polymer and having well-balanced permeability, shutdown temperature, and pin puncture strength. The invention also relates to methods for making such membranes, and the use of such membranes as battery separator film in, e.g., lithium ion secondary batteries.

9 Claims, 1 Drawing Sheet

Related U.S. Application Data application No. 61/164,817, filed on Mar. 30, 2009, provisional application No. 61/177,060, filed on May 11, 2009, provisional application No. 61/220,094, filed on Jun. 24, 2009.

(51) Int. Cl.
  *B01D 71/76* (2006.01)
  *H01M 2/16* (2006.01)
  *B32B 27/32* (2006.01)
  *B29C 47/00* (2006.01)

(56) References Cited

U.S. PATENT DOCUMENTS

| | | | |
|---|---|---|---|
| 6,824,865 B1 | 11/2004 | Funaoka et al. | |
| 2005/0098913 A1* | 5/2005 | Funaoka | B01D 67/003 264/41 |
| 2007/0221568 A1 | 9/2007 | Nagashiki et al. | |
| 2008/0057388 A1 | 3/2008 | Kono et al. | |
| 2008/0057389 A1* | 3/2008 | Kono | B01D 67/0009 429/144 |
| 2008/0193833 A1 | 8/2008 | Ohashi et al. | |
| 2009/0008816 A1* | 1/2009 | Takita | B01D 67/0027 264/204 |
| 2009/0226813 A1 | 9/2009 | Takita et al. | |
| 2010/0316902 A1 | 12/2010 | Takita et al. | |
| 2011/0117439 A1 | 5/2011 | Yamada et al. | |

FOREIGN PATENT DOCUMENTS

| | | |
|---|---|---|
| JP | 60-242035 A | 12/1985 |
| JP | 3-64334 A | 3/1991 |
| JP | 3-201360 A | 9/1991 |
| JP | 5-25305 A | 2/1993 |
| JP | 11-269289 | 10/1999 |
| JP | 11-269289 A | 10/1999 |
| JP | 2001-072788 | 3/2001 |
| JP | 2001-200081 | 7/2001 |
| JP | 2002-338730 | 11/2002 |
| JP | 2002-338730 A | 11/2002 |
| WO | 97/23554 A1 | 7/1997 |
| WO | 2007/052663 A1 | 5/2007 |
| WO | 2007/132942 A1 | 11/2007 |
| WO | 2008/016174 A1 | 2/2008 |

OTHER PUBLICATIONS

US Official Action dated Oct. 15, 2013.
US Official Action dated Jun. 20, 2014 from related U.S. Appl. No. 13/260,621.
US Official Action dated May 30, 2014 from corresponding U.S. Appl. No. 13/259,172.
US Official Action dated Sep. 18, 2014 from related U.S. Appl. No. 13/259,172.
US Official Action dated Dec. 18, 2015 from related U.S. Appl. No. 13/259,226.

* cited by examiner

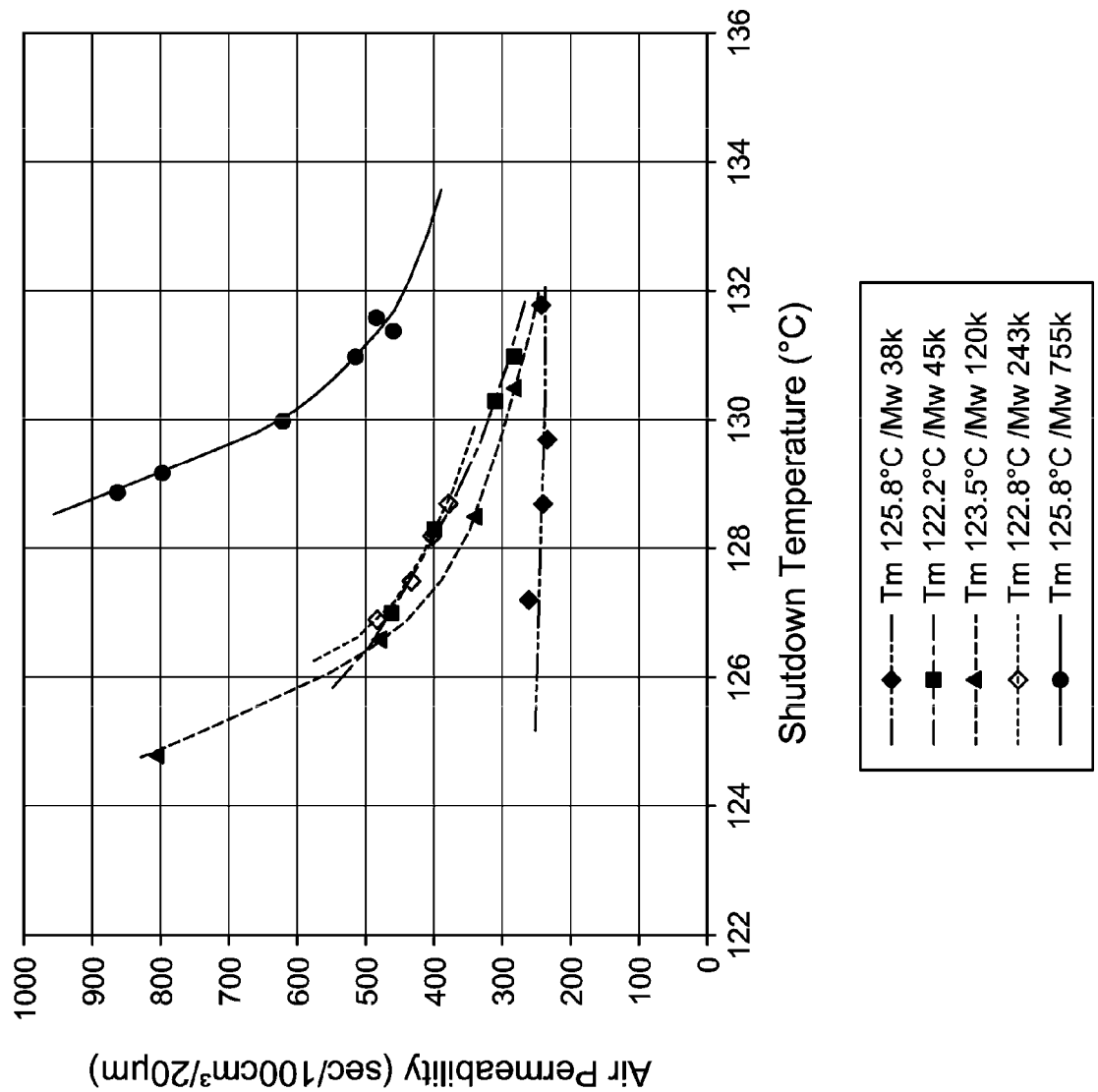

MICROPOROUS MEMBRANES, METHODS FOR MAKING SUCH MEMBRANES, AND THE USE OF SUCH MEMBRANES AS BATTERY SEPARATOR FILM

CROSS-REFERENCE TO RELATED APPLICATIONS

This application claims priority from U.S. Provisional Application Ser. No. 61/177,060 filed May 11, 2009, and EP 09163698.5 filed Jun. 25, 2009; U.S. Provisional Application Ser. No. 61/164,824 filed Mar. 30, 2009, and EP 09160964.4 filed May 25, 2009; U.S. Provisional Application Ser. No. 61/164,817 filed Mar. 30, 2009, and EP 09160965.1 filed May 25, 2009; U.S. Provisional Application Ser. No. 61/164,833 filed Mar. 30, 2009, and EP 09160966.9 filed May 25, 2009; U.S. Provisional Application Ser. No. 61/164,827 filed Mar. 30, 2009, and EP 09160967.7 filed May 25, 2009; U.S. Provisional Application Ser. No. 61/220,094 filed Jun. 24, 2009, and EP 09168194.0 filed Aug. 19, 2009, the contents of each of which are incorporated by reference in their entirety.

FIELD OF THE INVENTION

The present invention relates to microporous membranes comprising polymer and having well-balanced permeability, shutdown temperature, and pin puncture strength. The invention also relates to methods for making such membranes, and the use of such membranes as battery separator film in, e.g., lithium ion secondary batteries.

BACKGROUND OF THE INVENTION

Microporous membranes are useful as separators for primary and secondary batteries. Such batteries include lithium ion secondary batteries, lithium-polymer secondary batteries, nickel-hydrogen batteries, nickel-cadmium batteries, nickel-zinc batteries, silver-zinc batteries, etc. When a microporous polyolefin membrane is used as a separator for a lithium ion battery, the membrane's properties significantly affect the battery's performance. In particular, the microporous polyolefin membrane's permeability and shutdown temperature generally affect the battery's performance.

It is desirable for a battery separator film to have a relatively low shutdown temperature compared to its meltdown temperature in order to improve battery safety margin. In general, microporous polyolefin membranes containing polyethylene have a relatively high shutdown temperature of about 132° C. to 140° C.

Microporous membranes having high strength and high permeability have been made using a ultra-high-molecular-weight polyolefin (hereinafter called "UHMWPO"). For example, JP60-242035A discloses a UHMWPO membrane made by a process comprising molding a gel-like sheet made by extruding a solution containing a UHMWPO having an average molecular weight $\geq 7 \times 10^5$ and a solvent, removing the solvent from the gel-like sheet, and then stretching the gel-like sheet. JP03-064334A discloses a polyolefin microporous membrane having a specific molecular weight distribution in order to produce the microporous membrane from a high-concentration UHMWPO solution.

Japanese patent applications JP60-023954A, JP03-201360A, and JP05-025305A disclose battery separator film comprising branched low density polyethylene (LDPE) and/or linear low density polyethylene (LLDPE). The film is said to have a relatively low shutdown temperature. Further, Japanese patent application JP11-269289A discloses a microporous membrane comprising 2 to 80 wt % of a substantially linear ethylene-alpha-olefin copolymer having a melting peak of 95° C. to 125° C. in order to reduce shutdown temperature. Though shutdown temperature is improved, the use of relatively low melting peak polyethylene can result in lower air permeability, particularly when film production, battery production, or battery use involves temperatures ≥ the polyethylene's melting peak. Japanese patent application JP2002-338730A discloses that this loss of permeability can be partially overcome by using a polyethylene having a relatively higher melting peak, e.g., in the range of 125° C. to 132° C.

While improvements have been made, membranes having relatively low shutdown temperature and relatively high air permeability are desired.

SUMMARY OF THE INVENTION

In an embodiment, the invention relates to a microporous membrane comprising a polyolefin having a melting peak temperature in the range of 115.0° C. to 130.0° C. and a weight-average molecular weight in the range of $5.0 \times 10^3$ to $4.0 \times 10^5$. Optionally, the membrane has an air permeability $\leq 5.0 \times 10^2$ seconds/100 cm$^3$/20 μm and a shutdown temperature $\leq 130.5$° C.

In another embodiment, the invention relates to a method for making a microporous membrane comprising:

(1) extruding a mixture of diluent and polymer, the polymer comprising (i) a first polyethylene having a melting peak temperature in the range of 115.0° C. to 130.0° C. and a weight-average molecular weight of $5.0 \times 10^3$ to $4.0 \times 10^5$, (2) stretching the extrudate in at least one planar direction, and (3) removing at least a portion of the diluent from the stretched extrudate to form the microporous membrane.

In another embodiment the invention relates to the microporous membrane produced by the preceding process.

In another embodiment, the invention relates to a battery comprising an electrolyte, an anode, a cathode, and a separator situated between the anode and the cathode, wherein the separator comprises a microporous membrane of any preceding embodiment.

In yet another embodiment, the invention relates to the use of such a battery as a power source in, e.g., an electric vehicle, hybrid electric vehicle, power tool, computer, mobile phone, consumer electronics, etc.

BRIEF DESCRIPTION OF THE FIGURE

The FIGURE illustrates the effect of polyolefin melting peak and weight average molecular weight on membrane air permeability and shutdown temperature. Increasing the amount of the designated polyolefin results in decreased air permeability and lower membrane shutdown temperature.

DETAILED DESCRIPTION OF THE INVENTION

The invention relates to a microporous membrane having an improved balance of permeability and shutdown temperature. It has been discovered that when a microporous membrane comprises polymer having a relatively low melting peak ("Tm"), e.g., ≤130.0° C., the membrane's shutdown temperature decreases and the membrane's air permeability increases as the amount of the polymer in the membrane increases. Consequently, when a relatively high Tm polymer is used, the relatively large amount needed to suppress shutdown temperature leads also to diminished air permeability. It has been discovered that this difficulty can be overcome, i.e., that both shutdown temperature and air permeability can be improved, by selecting a polymer having a Tm in the range of 115.0° C. to 130.0° C. and a weight average molecular weight ("Mw") in the range of $5.0 \times 10^3$ to $4.0 \times 10^5$. As shown in the FIGURE, a microporous membrane produced from such a polymer has good air permeability even at relatively low membrane shutdown temperature.

The FIGURE graphically illustrates tabulated (Table A) air permeability and shutdown performance of polyethylene microporous membranes as a function of the amount of polyethylene having Tm in the range of 115.0° C. to 130.0° C. and an Mw in the range of $5.0 \times 10^3$ to $4.0 \times 10^5$. Polyethylenes A through D have a Tm and Mw in the desired range. Polyethylene E is shown for comparison.

TABLE A

| Polymer | Symbol | Tm | Mw | Amount (wt. %) | Shutdown Temperature | Air Permeability |
|---|---|---|---|---|---|---|
| A | Solid Diamond | 125.8° C. | 38,000 | 4.9 | 131.8 | 243 |
| " | " | " | " | 9.8 | 129.7 | 234 |
| " | " | " | " | 12.3 | 128.7 | 238 |
| " | " | " | " | 16.4 | 127.1 | 242 |
| B | Solid Square | 122.2° C. | 45,000 | 2.5 | 131 | 283 |
| " | " | " | " | 3.3 | 130.3 | 308 |
| " | " | " | " | 5.7 | 128.3 | 397 |
| " | " | " | " | 7.4 | 127 | 460 |
| C | Solid Triangle | 123.5° C. | 120,000 | 4.9 | 130.5 | 284 |
| " | " | " | " | 10.7 | 128.5 | 339 |
| " | " | " | " | 14.8 | 126.6 | 477 |
| " | " | " | " | 19 | 124.8 | 807 |
| D | Open Diamond | 122.8° C. | 243,000 | 8.2 | 128.7 | 377 |
| " | " | " | " | 9 | 128.2 | 401 |
| " | " | " | " | 9.8 | 127.5 | 431 |
| " | " | " | " | 11 | 126.9 | 481 |
| E (Comparison) | Solid Circle | 125.8° C. | 755,000 | 8.2 | 131.6 | 481 |
| " | " | " | " | 10.7 | 131.4 | 459 |
| " | " | " | " | 12.3 | 131 | 512 |
| " | " | " | " | 14.8 | 130 | 619 |
| " | " | " | " | 16.4 | 129.2 | 795 |
| " | " | " | " | 18 | 128.9 | 861 |

For Polyethylene E, even at a membrane shutdown temperature of 131.0° C., the membrane's air permeability is $>5 \times 10^2$ seconds/100 cm$^3$/20 µm. The other curves in the FIGURE represent microporous membranes containing increasing amounts of polyethylene having a Tm in the range of 115.0° C. to 130.0° C. and an Mw in the range of $5.0 \times 10^3$ to $4.0 \times 10^5$ (polyethylene A through D). These membranes have relatively high air permeability ($\leq 5.0 \times 10^2$ seconds/100 cm$^3$/20 µm) even when the membrane's shutdown temperature is relatively low, e.g., $\leq 130.5°$ C.

[1] Composition of Materials Used to Produce the Microporous Polyolefin Membrane In an embodiment the microporous membrane is made by extruding a mixture of polymer and diluent. The diluent can be a solvent for the polymer. When the polymer is soluble in or miscible with the diluent, the polymer-diluent mixture can be called a polymeric solution. When the polymer is polyolefin and the diluent is liquid paraffin, the mixture can be called a polyolefin solution. When the polymer is a mixture of polymers, e.g., a combination of polyolefins, it can be called a polymeric composition, e.g., a polyolefin composition. The polymer can be a mixture of individual polymer components or a reactor blend, for example. In an embodiment, the membrane is produced from diluent and a mixture of polyolefin, where the diluent is a solvent for the polyolefin mixture such as liquid paraffin. Examples of polyolefin useful in this embodiment will now be described in more detail. While the invention is described in terms of these embodiments, it is not limited thereto, and the description of these embodiments is not meant to foreclose other embodiments within the broader scope of the invention.

(1) Polyethylene Resin(s)

In an embodiment, the polyolefin used to produce the microporous membrane comprises a mixture of polyolefins. For example, the membrane can be produced from a mixture of a first polyethylene having a Tm in the range of 115.0° C. and 130.0° C. and an Mw in the range of $5.0 \times 10^3$ to $4.0 \times 10^5$ and a second polyethylene having an Mw$\leq 1.0 \times 10^6$ and a melting peak $\geq 131.0°$ C. In another embodiment, the polyethylene mixture comprises the first polyethylene, the second polyethylene, and a third polyethylene having an Mw$>1.0 \times 10^6$. In yet another embodiment, the polyethylene mixture comprises the first polyethylene and the third polyethylene. The Mw of the polyethylene mixture is not critical, and can range, e.g., from about $1 \times 10^4$ to about $1 \times 10^7$, or from about $1 \times 10^5$ to about $5 \times 10^6$, or from about $2 \times 10^5$ to about $3 \times 10^6$. In an embodiment, the microporous membrane comprises $\geq 50$ wt. % polyethylene, based on the weight of the membrane. The polyethylene used to produce the microporous membrane can comprise polyolefin (homopolymer or copolymer) containing recurring ethylene units. Optionally, the polyethylene comprises polyethylene homopolymer and/or polyethylene copolymer wherein at least 85% (by number) of the recurring units are ethylene units.

(a) The First Polyethylene

The first polyethylene comprises an ethylene-based polyolefin homopolymer or copolymer having Tm in the range of from 115.0° C. to 130.0° C., and an Mw in the range of from $5.0 \times 10^3$ to $4.0 \times 10^5$. When the Tm is $\leq 115.0°$ C., it is more difficult to produce a thermally-stable membrane (one having low heat shrinkage, for example) without also reducing membrane permeability. Thermal treatment temperatures (e.g., heat setting temperatures)>115.0° C. are generally used to produce thermally-stable membranes, and membrane permeability decreases when the heat setting temperature is $\geq$ the polymer's Tm. When the first polyethylene's Tm is >131.0° C., it is more difficult to produce a microporous membrane having both high air permeability and low shutdown temperature. It has been discovered that when the first polyethylene's Mw is significantly <5.0×10³ or Mw is significantly >4.0×10⁵, it is more difficult to produce a microporous membrane having good air permeability even when Tm is relatively high, e.g., in the range of 125° C. to 130° C., or greater.

Tm is measured in accordance with JIS K7122 as follows. A sample of the first polyethylene is prepared as a 0.5-mm-thick molding that is melt-pressed at 210° C. and then stored for about 24 hours while exposed to a temperature of about 25° C. The sample is then placed in a sample holder of a differential scanning calorimeter (Pyris Diamond DSC available from Perkin Elmer, Inc.) and exposed to a temperature of 25° C. in a nitrogen atmosphere. The sample is then exposed to an increasing temperature (the first heating cycle) at a rate of 10° C./minute until a temperature of 230° C. is reached. The sample is exposed to the 230° C. temperature for 1 minute and then exposed to a decreasing temperature at a rate of 10° C./minute until a temperature of 30° C. is reached. The sample is exposed to the 30° C. temperature for 1 minute, and is then exposed to an increasing temperature at a rate of 10° C./minute (the second heating cycle) until a temperature of 230° C. is reached. The DSC records the amount of heat flowing to the sample during the second heating cycle. Tm is the temperature of the maximum heat flow to the sample as recorded by the DSC in the temperature range of 30° C. to 200° C. Polyethylene may show secondary melting peaks adjacent to the principal peak, and/or the end-of-melt transition, but for purposes herein, such secondary melting peaks are considered together as a single melting point, with the highest of these peaks being considered the Tm.

In an embodiment, the first polyethylene has a Tm in the range of from 120.0° C. to 128.0° C., such as 120.0° C. to 126.0° C., or 120.5° C. to 124.5° C., or 121.0° C. to 124.0° C. In another embodiment, the first polyethylene has Tm in the range of from 122.0° C. to 126.0° C.

In an embodiment, the first polyethylene has Mw in the range of from 8.0×10³ to 2.0×10⁵. In another embodiment, the first polyethylene has Mw in the range of from 1.0×10⁴ to 1.0×10⁵. Optionally, the first polyethylene has a molecular weight distribution ("MWD" defined as Mw/Mn)≤100, for example, in the range of from 1.5 to 20, from about 1.5 to about 5, or from about 1.8 to about 3.5.

In an embodiment, the first polyethylene comprises a copolymer of ethylene and a comonomer such as α-olefin. The comonomer is generally present in a relatively small amount compared to the amount of ethylene. For example, the comonomer amount is generally less than 10% by mole based on 100% by mole of the copolymer, such as from 1.0% to 5.0% by mol. The comonomer can be, for example, one or more of propylene, butene-1, pentene-1, hexene-1, 4-methylpentene-1, octene-1, vinyl acetate, methyl methacrylate, styrene, or other monomers. Such a polymer or copolymer can be produced using any suitable catalyst, including a single-site catalyst. For example, the polymer can be produced according to the methods disclosed in U.S. Pat. No. 5,084,534 (such as the methods disclosed therein in examples 27 and 41), which is incorporated by reference herein in its entirety.

In an embodiment, the amount of the first polyethylene can be, e.g., ≥1.0 wt. %, based on the total weight of polymer used to produce the membrane, such as from about 1.0 wt. % to 30.0 wt. % or 1.0 wt. % to 20.0 wt. %, e.g., about 4.0 wt. % to 17.0 wt. %, or about 8.0 wt. % to about 13.0 wt. %.

(b) The Second Polyethylene

The second polyethylene has a Tm≥131.0° C. (e.g., in the range of 131.0° C. to 135° C.) and an Mw≤1.0×10⁶, e.g., in the range of from 1.0×10⁵ to 9.0×10⁵, for example from about 4×10⁵ to about 8×10⁵. Tm is measured the same way as for the first polyethylene. Optionally, the second polyethylene has a molecular weight distribution ("MWD")≤1.0×10², e.g., in the range of from 1 to 50.0, such as from about 3.0 to about 20.0. For example, the second polyethylene can be one or more of a high density polyethylene ("HPDE"), a medium density polyethylene, a branched low density polyethylene, or a linear low density polyethylene. Optionally, the second polyethylene is HDPE. Optionally, the second polyethylene has terminal unsaturation. For example, the second polyethylene can have an amount of terminal unsaturation ≥0.20 per 10,000 carbon atoms, e.g., ≥5.0 per 10,000 carbon atoms, such as ≥10.0 per 10,000 carbon atoms. The amount of terminal unsaturation can be measured in accordance with the procedures described in PCT Publication WO1997/23554, for example. In another embodiment, the second polyethylene has an amount of terminal unsaturation <0.20 per 10,000 carbon atoms. Optionally, the amount of second polyethylene is ≤99.0 wt. %, e.g., in the range of from 25.0 wt. % to 99.0 wt. %, e.g., from 50.0 wt. % to 95.0 wt. %, or 60.0 wt. % to 85.0 wt. %, based on the total amount of polymer used to produce the membrane.

In an embodiment, the second polyethylene is at least one of (i) an ethylene homopolymer or (ii) a copolymer of ethylene and a comonomer such as propylene, butene-1, hexene-1, etc. When used, the comonomer amount is ≤10.0% by mole based on 100% by mole of the copolymer. Such a polymer or copolymer can be produced by any convenient polymerization process, such as those using a Ziegler-Natta or a single-site catalyst. The comonomer can be α-olefin, for example, optionally, the comonomer is one or more of propylene, butene-1, pentene-1, hexene-1, 4-methylpentene-1, octene-1, vinyl acetate, methyl methacrylate, styrene, or other monomer.

(c) The Third Polyethylene

In an embodiment, the third polyethylene has an Mw>1.0×10⁶, e.g., in the range of 1.1×10⁶ to about 5×10⁶, for example from about 1.2×10⁶ to about 3×10⁶, such as about 2×10⁶. Optionally, the third polyethylene has an MWD≤1.0×10², e.g., from about 2.0 to about 1.0×10², such as from about 4 to about 20 or about 4.5 to about 10.0. For example, the third polyethylene can be an ultra-high molecular weight polyethylene ("UHMWPE"). Optionally, the amount of the third polyethylene is ≤99.0 wt. %, e.g., in the range of from 0 wt. % to 74.0 wt. %, e.g., 1.0 wt. % to 46.0 wt. %, or 7.0 wt. % to 32.0 wt. %, based on the total weight of polymer used to produce the membrane. If the content of the third polyethylene is >74.0 wt %, it is more difficult to produce a microporous membrane having improved shutdown and heat shrinkage properties. In an embodiment, the third polyethylene is at least one of (i) an ethylene homopolymer or (ii) a copolymer of ethylene and a comonomer such as propylene, butene-1, hexene-1, etc. When used, the comonomer amount is ≤10% by mole based on 100% by mole of the copolymer. The comonomer can be polyolefin, for example. Optionally, the comonomer is one or more of propylene, butene-1, pentene-1, hexene-1, 4-methylpentene-1, octene-1, vinyl acetate, methyl methacrylate, styrene, or other comonomer. Such a polymer or copolymer can be produced using any convenient polymerization process such as those using a Ziegler-Natta or a single-site catalyst.

(d) The Combined First, Second, and Third Polyethylene

In an embodiment, the membrane is produced from diluent and a mixture of the first, second, and third polyethylenes. When the first, second, and third polyethylenes are used, the MWD of the polyethylene mixture in the polymer-diluent mixture can be controlled by conventional methods, e.g., by regulating the relative amounts and MWDs of the resins in the mixture, or by regulating reactor blend process conditions. In an embodiment, the second polyethylene is a high-density polyethylene. Optionally, the amount of combined second and third polyethylene in the membrane is ≥70.0 wt. %, e.g., in the range of 70.0 wt. % to about 95.0 wt. %, based on the weight of the membrane, with the balance being the first polyethylene.

(e) Molecular Weight Distribution (MWD)

The MWD of the combined polyethylene can be in the range from 5.0 to about $3.0 \times 10^2$, or from 5.0 to about 100 or from about 10 to about 30. Although it is not critical, when the MWD is <5.0, extrusion can be more difficult and it can be more difficult to make a microporous polyolefin membrane having acceptable thickness uniformity. On the other hand, when the MWD is >$3.0 \times 10^2$, it can be more difficult to make a microporous membrane having sufficient strength. The MWD of polyolefin or a mixture of polyolefins can be controlled, e.g., by using multi-stage polymerization.

Polyethylene Mw and MWD is determined using a High Temperature Size Exclusion Chromatograph, or "SEC", (GPC PL 220, Polymer Laboratories), equipped with a differential refractive index detector (DRI). Three PLgel Mixed-B columns available from (available from Polymer Laboratories) are used. The nominal flow rate is 0.5 cm³/min, and the nominal injection volume is 300 µL. Transfer lines, columns, and the DRI detector are contained in an oven maintained at 145° C. The measurement is made in accordance with the procedure disclosed in "Macromolecules, Vol. 34, No. 19, pp. 6812-6820 (2001)".

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. Polymer solutions are prepared by placing dry polymer in a glass container, adding the desired amount of the above TCB solvent, then heating the mixture at 160° C. with continuous agitation for about 2 hours. The concentration of polymer in the solution is 0.25 to 0.75 mg/ml. Sample solution is filtered off-line before injecting to GPC with 2 µm filter using a model SP260 Sample Prep Station (available from Polymer Laboratories).

The separation efficiency of the column set is calibrated with a calibration curve generated using a seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

(2) Additional Polymer

In addition to the polyethylene resin(s), the polyolefin mixture can optionally contain additional polymers such as a fourth polyolefin. The fourth polyolefin can be one or more homopolymer or copolymer of, e.g., polypropylene, polybutene-1, polypentene-1, poly-4-methylpentene-1, polyhexene-1, polyoctene-1, polyvinyl acetate, polymethyl methacrylate, polystyrene, etc. Optionally, the fourth polyolefin has an Mw in the range of about $1 \times 10^4$ to about $4 \times 10^6$. When used, the amount of the fourth polyolefin is generally in the range of <20.0 wt. %, based on the weight of the polymer used to produce the microporous membrane, such as in the range of 0.5 wt. % to 10.0 wt. %. The polyolefin composition can also contain a polyethylene wax, e.g., one having an Mw of about $1 \times 10^3$ to about $1 \times 10^4$. When used, the amount of polyethylene wax is generally <about 20.0% wt. % of the combined weight of the first second and third polymers and the polyethylene wax used to produce the microporous membrane. In an embodiment, the amount of polyethylene wax is <10.0 wt. %, such as in the range of 0.5 wt. % to 10 wt. %. When used, the amount of fourth polymer and/or polyethylene wax is not critical provided they are not used in an amount that would cause significant deterioration of the properties of the microporous polyolefin membrane. In an embodiment, the fourth polymer is polypropylene having an Mw≥$1.0 \times 10^6$ and a heat of fusion (second melt) ≥90 J/g. Suitable polypropylenes are described in PCT Patent Publication No. WO2007/132942, which is incorporated by reference herein in its entirety.

[2] Production Method of Microporous Membrane

In an embodiment, the microporous membrane is a monolayer (i.e., single-layer) membrane produced from the extrudate. The extrudate can be produced from polyolefin and diluent as follows.

In an embodiment, the microporous membrane is produced by a process comprising: (1) combining diluent (e.g., a membrane-forming solvent) and polyolefin, (2) extruding the combined diluent and polyolefin through a die to form an extrudate; (3) optionally cooling the extrudate to form a cooled extrudate, e.g., a gel-like sheet; (4) stretching the cooled extrudate in at least one planar direction, e.g., stretching in the transverse direction (TD), the machine direction (MD), or both; and (5) removing at least a portion of the diluent from the extrudate or cooled extrudate to form a membrane.

Optionally, the process further comprises (6) removing at least a portion of any remaining volatile species from the membrane at any time after step (5).

Optionally, the process further comprises (7) subjecting the membrane to a thermal treatment (such as heat setting or annealing) at any time after step (5).

Optionally, the process further comprises stretching the membrane in at least one planar direction at any time after step (5), e.g., between steps (6) and (7). For example, the process can further comprise (8) stretching the dried membrane of step (6) in the MD from the first dry length to a second dry length larger than the first dry length by a magnification factor in the range of from about 1.1 to about 1.5 and stretching the membrane in the TD from a first dry width to a second width that is larger than the first dry width by a magnification factor in the range of from about 1.1 to about 1.3; and then (9) decreasing the second dry width to a third dry width, the third dry width being in the range of from the first dry width to about 1.1 times larger than the first dry width.

An optional hot solvent treatment step, an optional heat setting step, an optional cross-linking step with ionizing radiation, and an optional hydrophilic treatment step, etc., as described in PCT Publication WO2008/016174 can be conducted if desired. Neither the number nor order of the optional steps is critical.

(1) Combining Polyolefin and Diluent

The polyolefin mixture as described above can be combined, e.g., by dry mixing or melt blending, and then the polyolefin mixture can be combined with at least one diluent to produce a polyolefin-diluent mixture, e.g., a polyolefin solution. Alternatively, the polyolefin mixture and diluent can be combined in a single step. The resins and solvents can be added sequentially, in parallel, or in a combination thereof. Alternatively, a polyolefin mixture can produced by first combining at least a portion of the resins to make a polyolefin composition, and then combining the polyolefin composition with at least one membrane-forming solvent (and optionally additional portions of the resins and/or additional resins) to produce a polyolefin solution. Optionally, the polyolefin solution contains additives such as one or more of antioxidant, fine silicate powder (pore-forming material), etc. The amount of such additives is not critical, provided they are not present in amounts large enough to adversely affect the membrane's properties. Generally, the amount of such additives in aggregate does not exceed 1 wt. %, based on the weight of the polyolefin solution.

The use of a diluent comprising liquid membrane-forming solvent can make it less difficult to conduct stretching at relatively high magnifications. The liquid solvents can be, for example, aliphatic, alicyclic or aromatic hydrocarbons such as nonane, decane, decalin, p-xylene, undecane, dodecene; liquid paraffin; mineral oil distillates having boiling points comparable to those of the above hydrocarbons; and phthalates liquid at room temperature, such as dibutyl phthalate, dioctyl phthalate, etc. The use of a non-volatile solvent such as liquid paraffin can make it easier to obtain a gel-like molding (or gel-like sheet) having a stable solvent content. In an embodiment, one or more solid solvents, which are miscible with the polyolefin solution or polyolefin composition during melt-blending but solid at room temperature, may be added to the liquid solvent. Such solid solvents can be, e.g., stearyl alcohol, ceryl alcohol, paraffin waxes, etc. Solid solvent can be used without liquid solvent, but in this case it can be more difficult to evenly stretch the gel-like sheet during step (4).

In an embodiment, the viscosity of the liquid solvent ranges from about 30 cSt to about 500 cSt, or from about 30 cSt to about 200 cSt, when measured at a temperature of 25° C. Although the choice of viscosity is not particularly critical, when the viscosity at 25° C. is less than about 30 cSt, the polyolefin solution might foam, resulting in difficulty in blending. On the other hand, when the viscosity is more than about 500 cSt, it can be more difficult to remove the solvent during step (5). The polyolefin solution can contain additives such as one or more antioxidant. In an embodiment, the amount of such additives does not exceed 1 wt. % based on the weight of the polyolefin solution.

The amount of membrane-forming solvent used to produce the extrudate is not critical, and can be in the range, e.g., of from about 25 wt. % to about 99 wt. % based on the weight of the combined membrane-forming solvent and polyolefin composition with the balance being polymer, e.g., the combined first, second, and third polyethylene.

(2) Extruding

In an embodiment, the combined polyolefin composition and the diluent (a membrane-forming solvent in this case) are conducted from an extruder to a die.

The extrudate or cooled extrudate should have an appropriate thickness to produce, after the stretching steps, a final membrane having the desired thickness (generally 3 μm or more). For example, the extrudate can have a thickness in the range of about 0.1 mm to about 10 mm, or about 0.5 mm to 5 mm. Extrusion is generally conducted with the mixture of polyolefin composition and membrane-forming solvent in the molten state. When a sheet-forming die is used, the die lip is generally heated to an elevated temperature, e.g., in the range of 140° C. to 250° C. Suitable process conditions for accomplishing the extrusion are disclosed in PCT Publications WO 2007/132942 and WO 2008/016174. The machine direction ("MD") is defined as the direction in which the extrudate is produced from the die. The transverse direction ("TD") is defined as the direction perpendicular to both MD and the thickness direction of the extrudate. The extrudate can be produced continuously from a die, or it can be produced from the die in portions (as is the case in batch processing) for example. The definitions of TD and MD are the same in both batch and continuous processing.

(3) Optional Extrudate Cooling

Optionally the extrudate can be exposed to a temperature in the range of 5° C. to 40° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publications No. WO 2008/016174 and WO 2007/132942, for example.

(4) Stretching the Extrudate

The extrudate or cooled extrudate is stretched in at least one direction. The extrudate can be stretched by, for example, a tenter method, a roll method, an inflation method or a combination thereof, as described in PCT Publication No. WO 2008/016174, for example. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) can be used, though simultaneous biaxial stretching is preferable. When biaxial stretching is used, the amount of magnification need not be the same in each stretching direction.

The stretching magnification factor can be, for example, 2 fold or more, preferably 3 to 30 fold in the case of monoaxial stretching. In the case of biaxial stretching, the stretching magnification factor can be, for example, 3 fold or more in any direction (e.g., in the range of 3 fold to 30 fold), such as 16 fold or more, e.g., 25 fold or more, in area magnification. An example of this stretching step includes stretching from about 9 fold to about 49 fold in area magnification. Again, the amount of stretch in each direction need not be the same. The magnification factor operates multiplicatively on film size. For example, a film having an initial width (TD) of 2.0 cm that is stretched in TD to a magnification factor of 4 fold will have a final width of 8.0 cm. The machine direction ("MD") is a direction in the plane of the film (the extrudate in this instance) which is oriented approximately along the direction of travel as the film is formed, i.e., the longest axis of the film during production. The transverse direction ("TD") also lies in the plane of the film and is approximately perpendicular to both the machine direction and a third axis approximately parallel to the thickness of the film.

While not required, the stretching can be conducted while exposing the extrudate to a temperature (the stretching temperature) in the range of from about Tcd to Tm, where in this instance Tcd and Tm are the crystal dispersion temperature and melting peak of the polyethylene having the lowest melting peak among the polyethylenes used to produce the extrudate (usually the first polyethylene). The crystal dispersion temperature is determined by measuring the temperature characteristics of dynamic viscoelasticity according to ASTM D 4065. In an embodiment where Tcd is in the range of about 90° C. to 100° C., the stretching temperature can be from 90.0° C. to 125.0° C.; e.g., from about 100° C. to 125.0° C., such as from 105° C. to 125.0° C. Optionally, the stretching temperature is ≤(Tm−10.0° C.).

In an embodiment, the stretched extrudate undergoes an optional thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polyolefin and diluent, its length and width are referred to as the "wet" length and "wet" width. In an embodiment, the stretched extrudate is exposed to a temperature in the range of 120.0° C. to 125.0° C. for a time sufficient to thermally treat the extrudate, e.g., a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as dry orientation and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven, etc., can be used with or instead heated air.

(5) Diluent Removal

In an embodiment, at least a portion of the diluent is removed (or displaced) from the stretched extrudate to form a dried membrane. A displacing (or "washing") solvent can be used to remove (wash away, or displace) the diluent, as described in PCT Publication No. WO 2008/016174, for example.

(6) Drying the Membrane

In an embodiment, at least a portion of any remaining volatile species (e.g., washing solvent) is removed from the dried membrane after diluent removal. Any method capable of removing the washing solvent can be used, including conventional methods such as heat-drying, wind-drying (moving air), etc. Process conditions for removing volatile species such as washing solvent can be the same as those disclosed in PCT Publication No. WO 2008/016174, for example.

(7) Thermal Treatment

In am embodiment, the membrane is subjected to a thermal treatment such as heat setting. During heat-setting, the membrane is, e.g., exposed to a temperature in the range of from about Tcd to about Tm, for example from 90.0° C. to 130.0° C., from about 100° C. to 128° C. or 105° C. to 125° C. In this instance Tm is the melting peak of the polymer having the lowest melting peak among the polymers used to produce the membrane, e.g., the first polyethylene.

(8) Stretching the Membrane (Dry Orientation)

Optionally, the dried membrane of the step (6) can be stretched (called "dry stretching" since at least a portion of the diluent has been removed or displaced) in at least one direction between the step (6) and (7). A dried membrane that has been dry stretched is called an "oriented" membrane. Before dry stretching, the dried membrane has an initial size in MD (a first dry length) and an initial size in TD (a first dry width). As used herein, the term "first dry width" refers to the size of the dried membrane in the TD prior to the start of dry orientation. The term "first dry length" refers to the size of the dried membrane in the MD prior to the start of dry orientation. Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is ≤the MD dry stretching magnification factor. The TD dry stretching magnification factor can be in the range of from about 1.1 to about 1.3. The dry stretching (also called re-stretching since the membrane-forming solvent-containing extrudate has already been stretched) can be sequential or simultaneous in MD and TD. Since TD heat shrinkage generally has a greater effect on battery properties than does MD heat shrinkage, the amount of TD magnification generally does not exceed the amount of MD magnification. When TD dry stretching is used, the dry stretching can be simultaneous in MD and TD or sequential. When the dry stretching is sequential, generally MD stretching is conducted first followed by TD stretching.

The dry stretching can be conducted while exposing the dried membrane to a temperature ≤Tm, e.g., in the range of from about Tcd−30° C. to Tm. In this instance Tm is the melting peak of the polymer having the lowest melting peak among the polymers used to produce the membrane, e.g., the first polyethylene. In an embodiment, the stretching temperature is conducted with the membrane exposed to a temperature in the range of from about 70.0 to about 130.0° C., for example from about 80° C. to about 129.0° C. In an embodiment, the MD stretching is conducted before TD stretching, and (i) the MD stretching is conducted while the membrane is exposed to a first temperature in the range of Tcd−30° C. to about Tm−10° C., for example 70.0° C. to 129.0° C., or about 80° C. to about 125° C. and (ii) the TD stretching is conducted while the membrane is exposed to a second temperature that is higher than the first temperature but lower than Tm, for example 70.0° C. to 129.0° C., or about 105° C. to about 125° C., or about 110° C. to about 120° C.

In an embodiment, the total MD dry stretching magnification factor is in the range of from about 1.1 to about 1.5, such as 1.2 to 1.4; the total TD dry stretching magnification factor is in the range of from about 1.1 to about 1.3, such as 1.15 to 1.25; the MD dry stretching is conducted before the TD dry stretching, the MD dry stretching is conducted while the membrane is exposed to a temperature in the range of 80.0° C. to about 120.0° C., and the TD dry stretching is conducted while the membrane is exposed to a temperature in the range of 115.0° C. to about 130.0° C., but less than Tm.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not particularly critical, the upper limit of the stretching rate is preferably 50%/second to prevent rupture of the membrane.

(9) Controlled Reduction of the Membrane's Width (Heat-Relaxing of the Membrane)

Following the dry stretching, the dried membrane is optionally subjected to a controlled reduction in width from the second dry width to a third dry width, the third dry width being in the range of from the first dry width to about 1.1 times larger than the first dry width. The width reduction generally conducted while the membrane is exposed to a temperature ≥Tcd−30° C., but no greater than Tm of the first polyethylene. For example, during width reduction the membrane can be exposed to a temperature in the range of from 70.0° C. to about 130.0° C., such as from about 115° C. to about 130.0° C., e.g., from about 120° C. to about 128° C. In an embodiment, the decreasing of the membrane's width is conducted while the membrane is exposed to a temperature that is lower than Tm of the first polyethylene. In an embodiment, the third dry width is in the range of from 1.0 times larger than the first dry width to about 1.1 times larger than the first dry width.

It is believed that exposing the membrane to a temperature during the controlled width reduction that is ≥ the temperature to which the membrane was exposed during the TD stretching leads to greater resistance to heat shrinkage in the finished membrane.

[3] Structure, Properties, and Composition

In a particular embodiment, the membrane comprises 5.0 wt. % to 15.0 wt. % of the first polyethylene, based on the weight of the membrane. The first polyethylene is a copolymer of ethylene and 1.0 mol % to 5.0 mol % of propylene, butene, hexene or octene. The copolymer has a Tm in the range of 122.0° C. to 126° C. and an Mw in the range of $3.0 \times 10^4$ to $2.5 \times 10^5$. The membrane has a shutdown temperature in the range of 125.0° C. to 130.0° C., and an air permeability in the range of $1.0 \times 10^2$ seconds/100 cm$^3$/20 µm to $5.0 \times 10^2$ seconds/100 cm$^3$/20 µm.

In an embodiment, the membrane's thickness is generally in the range of from about 1 µm to about 100 µm, e.g., from about 5 µm to about 30 µm. The thickness of the microporous membrane can be measured by a contact thickness meter at 1 cm longitudinal intervals over the width of 20 cm, and then averaged to yield the membrane thickness. Thickness meters such as the Litematic available from Mitsutoyo Corporation are suitable. This method is also suitable for measuring thickness variation after heat compression, as described below. Non-contact thickness measurements are also suitable, e.g., optical thickness measurement methods.

The final microporous membrane generally comprises the polymer used to produce the extrudate. A small amount of diluent or other species introduced during processing can also be present, generally in amounts less than 1 wt. % based on the weight of the microporous membrane. A small amount of polymer molecular weight degradation might occur during processing, but this is acceptable. In an embodiment, molecular weight degradation during processing, if any, causes the value of MWD of the polymer in the membrane to differ from the MWD of the polymer used to produce the membrane by no more than, e.g., about 10%, or no more than about 1%, or no more than about 0.1%.

While the extrudate and the microporous membrane can contain other materials such as inorganic species (e.g., species containing silicon and/or aluminum atoms), and/or heat-resistant polymers such as those described in PCT Publications WO 2007/132942 and WO 2008/016174, these are not required. In an embodiment, the extrudate and membrane are substantially free of such materials. Substantially free in this context means the amount of such materials in the microporous membrane is less than 1.0 wt. %, based on the total weight of the polymer used to produce the extrudate.

The microporous membrane can be a monolayer membrane. In an embodiment, the microporous membrane further comprises a second membrane. The second membrane can be, e.g., a microporous layer.

Optionally, the microporous membrane has one or more of the following properties.

(a) Normalized Air Permeability ≤$5.0 \times 10^2$ sec/100 cm$^3$/20 µm

In an embodiment, the membrane's normalized air permeability (Gurley value, expressed as the air permeability of an equivalent membrane having a thickness of 20 µm) is ≤$5.0 \times 10^2$ seconds/100 cm$^3$/20 µm, e.g., in the range of about 50.0 seconds/100 cm$^3$/20 µm to about $5.0 \times 10^2$ seconds/100 cm$^3$/20 µm. Since the air permeability value is normalized to the value for an equivalent membrane having a film thickness of 20 µm, the membrane's air permeability value is expressed in units of "seconds/100 cm$^3$/20 µm". In an embodiment, the normalized air permeability is in the range of 100 seconds/100 cm$^3$/20 µm to about 450 seconds/100 cm$^3$/20 µm. Normalized air permeability is measured according to JIS P8117, and the results are normalized to the permeability value of an equivalent membrane having a thickness of 20 µm using the equation A=20 µm*(X)/$T_1$, where X is the measured air permeability of a membrane having an actual thickness $T_1$ and A is the normalized air permeability of an equivalent membrane having a thickness of 20 µm.

(b) Porosity In The Range Of From About 25% To About 80%

In an embodiment, the membrane has a porosity ≥25%, e.g., in the range of about 25% to about 80%, or 30% to 60%. The membrane's porosity is measured conventionally by comparing the membrane's actual weight to the weight of an equivalent non-porous membrane of the same composition (equivalent in the sense of having the same length, width, and thickness). Porosity is then determined using the formula: Porosity %=100×(w2−w1)/w2, wherein "w1" is the actual weight of the microporous membrane and "w2" is the weight of the equivalent non-porous membrane having the same size and thickness.

(c) Shutdown Temperature≤130.5° C.

The microporous membrane's shutdown temperature is measured by the method disclosed in PCT publication WO2007/052663, which is incorporated by reference herein in its entirety. According to this method, the microporous membrane is exposed to an increasing temperature (5° C./minute beginning at 30° C.) while measuring the membrane's air permeability. The microporous membrane's shutdown temperature is defined as the temperature at which the microporous membrane's air permeability (Gurley Value) first exceeds 100,000 seconds/100 cm$^3$. The microporous membrane's air permeability is measured according to JIS P8117 using an air permeability meter (EGO-1T available from Asahi Seiko Co., Ltd.).

In an embodiment, the membrane has a shutdown temperature in the range of 120.0° C. to 130.0° C., e.g., in the range of from 124.0° C. to 129.0° C.

(e) Meltdown Temperature ≥140.0° C.

Meltdown temperature is measured by the following procedure: A rectangular sample of 3 mm×50 mm is cut out of the microporous membrane such that the long axis of the sample is aligned with the microporous membrane's TD and the short axis is aligned MD. The sample is set in a thermomechanical analyzer (TMA/SS6000 available from Seiko Instruments, Inc.) at a chuck distance of 10 mm, i.e., the distance from the upper chuck to the lower chuck is 10 mm. The lower chuck is fixed and a load of 19.6 mN applied to the sample at the upper chuck. The chucks and sample are enclosed in a tube which can be heated. Starting at 30° C., the temperature inside the tube is elevated at a rate of 5° C./minute, and sample length change under the 19.6 mN load is measured at intervals of 0.5 second and recorded as temperature is increased. The temperature is increased to 200° C. The meltdown temperature of the sample is defined as the temperature at which the sample breaks, generally at a temperature in the range of about 140° C. to about 200° C. Using the first polyethylene to produce the microporous membrane is not believed to significantly affect the membrane's meltdown temperature.

[4] Battery Separator and Battery

The microporous membrane of this invention has well-balanced shutdown temperature and air permeability, and is permeable to liquid (aqueous and non-aqueous) at atmospheric pressure. Thus, the microporous membrane can be used as a battery separator, filtration membrane, and so on. The microporous membrane is particularly useful as a secondary battery separator, such as in a nickel-hydrogen battery, nickel-cadmium battery, nickel-zinc battery, silver-zinc battery, lithium-ion battery, lithium-ion polymer battery separator. In an embodiment, the membrane is used as battery separator film in lithium-ion secondary batteries.

Such batteries are described in PCT publication WO 2008/016174 which is incorporated by reference herein in its entirety.

This invention will be described in more detail with reference to Examples below without intention of restricting the scope of this invention.

EXAMPLES

Example 1

The microporous membrane is produced from a mixture of diluent and polyethylene. The polyethylene comprises (a) 12.3 wt. % of a first polyethylene (produced using a single site catalyst) having an Mw of $3.8 \times 10^4$, and MWD of 3.0, and a Tm of 125.8° C., (b) 69.7 wt. % of a second polyethylene (HDPE) having an Mw of $5.6 \times 10^5$ and an MWD of 4.1, and (c) 18 wt. % of a third polyethylene (UHMWPE) having an Mw of $1.95 \times 10^6$ and an MWD of 5.1, the weight percents being based on the weight of the polyethylene in the mixture. The polyethylenes are combined with 0.5 wt. % of tetrakis [methylene-3-(3,5-ditertiary-butyl-4-hydroxyphenyl)-propionate]methane (antioxidant), based on the weight of the polyethylene in the mixture.

The polyethylene solution is supplied from the double-screw extruder to a T-die, and extruded in about 1.0-mm-thick sheet shape. The extrudate is cooled by a cooling roll controlled at 20° C. to form a gel-like sheet. The gel-like sheet is simultaneously biaxially stretched by a batch-type stretching machine to 5-fold in both MD and TD while exposing the extrudate to a temperature of 115° C. The extrudate is then fixed to an aluminum frame plate of 20 cm×20 cm, an immersed in a washing bath of methylene chloride controlled at 25° C., and washed while swaying at 100 rpm for 3 minutes to remove the liquid paraffin. The washed membrane was air-dried at room temperature. While holding the size of the membrane substantially constant, the membrane is then held heat-set at 115° C. for 10 minutes to produce the final microporous membrane.

Example 2

Example 1 was repeated except the polyethylene comprises 9.8 wt. % of the first polyethylene; 72.2 wt. % of the second polyethylene; and 18 wt. % of the third polyethylene.

Example 3

Example 1 was repeated except the polyethylene comprises 16.4 wt. % of the first polyethylene, 65.6 wt. % of the second polyethylene, and 18 wt. % of the third polyethylene.

Example 4

Example 1 was repeated except that the polyethylene comprises 7.4 wt. % of a first polyethylene (produced with single site catalyst) having an Mw of $4.5 \times 10^4$, an MWD of 3.0, and a Tm of 122.2° C.; 74.6 wt. % of the second polyethylene; and 18 wt. % of the third polyethylene.

Example 5

Example 1 was repeated except that the polyethylene comprises 10.7 wt. % of a first polyethylene (produced using a single site catalyst) having an Mw of $1.2 \times 10^5$, an MWD of 2.5, and a Tm of 123.5° C.; 71.3 wt. % of the second polyethylene; and 18 wt. % of the third polyethylene.

Example 6

Example 1 was repeated except that the polyethylene comprises 13.1 wt. % of the first polyethylene of Example 4; 68.9 wt. % of the second polyethylene; and 18 wt. % of the third polyethylene.

Example 7

Example 1 was repeated except that the polyethylene comprises 8.2 wt. % a first polyethylene (produced with single site catalyst) having an Mw of $1.7 \times 10^5$, an MWD of 2.8, and a Tm of 123.0° C.; 73.8 wt. % of the second polyethylene; and 18 wt. % of the third polyethylene.

Example 8

Example 1 was repeated except that the polyethylene comprises 9 wt. % of the a first polyethylene having an Mw of $1.7 \times 10^5$, an MWD of 2.8, and a Tm of 123.0° C. (Evolve™ SP3530, available from Prime Polymer Co., Ltd.); 73.0 wt. % of a second polyethylene (HDPE) having an Mw of $7.5 \times 10^5$ and an MWD of 11.9; and 18 wt. % of the third polyethylene.

Example 9

Example 3 was repeated except that following liquid paraffin removal the membrane is subjected to stretching in TD to a magnification of 1.2 fold while exposing the membrane to a temperature of 115° C.

Comparative Example 1

Example 1 was repeated except that the polyethylene comprises 82.0 wt. % of the second polyethylene; and 18 wt. % of the third polyethylene.

Comparative Example 2

Example 1 was repeated except that the polyethylene comprises 16.4 wt. % of a first polyethylene (produced with single site catalyst) having an Mw of $2.1 \times 10^5$, an MWD of 3.2, and a Tm of 98° C.; 65.6 wt. % of the second polyethylene; and 18 wt. % of the third polyethylene. The stretching temperature is 110° C. and the heat setting temperature is 90° C.

Comparative Example 3

Example 1 was repeated except that the polyethylene comprises 8.2 wt. % of a first polyethylene (produced with single site catalyst) having an Mw of $7.5 \times 10^5$, an MWD of 3.6, and a Tm of 120.0° C.; 73.8 wt. % of the second polyethylene; and 18 wt. % of the third polyethylene.

Comparative Example 4

Example 1 was repeated except that the polyethylene comprises 14.8 wt. % of the first polyethylene of Comparative Example 3; 67.2 wt. % of the second polyethylene; and 18 wt. % of the third polyethylene.

Comparative Example 5

Example 1 was repeated except that the polyethylene comprises 17.0 wt. % of a first polyethylene (produced with a single site catalyst) having an Mw of $1.7 \times 10^5$, an MWD of 3.0, and a Tm of 130.4° C.; 65.0 wt % of the second polyethylene; and 18 wt. % of the third polyethylene.

As is clear from Table 1, the microporous membranes of Examples 1 to 9 have shutdown temperatures ≤130.5° C. and an air permeability ≤$5.0 \times 10^2$/100 cm$^3$. They also have good balance among shutdown temperature and air permeability. Particularly, the microporous membranes in Examples 1, 3, 5, and 7 show excellent balance of these properties. The membranes of Comparative Examples 1, 3, and 5 have a higher shutdown temperature (>130.5° C.); and the membranes of Comparative Examples 2 and 4 have poor permeability. It is believed that the Tm of the first polyethylene in Comparative Example 2 becomes molten during stretching and consequently migrates into the membrane's micropores, thereby reducing permeability. It is believed that the Mw of the first polyethylene of Comparative Examples 3 and 4 is too large, which reduces the membrane's shutdown temperature only slightly at low concentration and that has an adverse effect on membrane permeability at higher concentration. It is believed that the first polyethylene of Comparative Example 5 has too high a Tm, which prevents a significant lowering of shutdown temperature even when used in a relatively large amount.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

TABLE 1

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Resin Composition | | | | | | | | | | |
| PE Composition | | | | | | | | | | |
| First PE | Mw | $3.8 \times 10^4$ | $3.8 \times 10^4$ | $3.8 \times 10^4$ | $4.5 \times 10^4$ | $1.2 \times 10^5$ | $2.6 \times 10^5$ | $1.7 \times 10^5$ | $2.4 \times 10^5$ | $3.8 \times 10^4$ |
| | Mw/Mn | 3.0 | 3.0 | 3.0 | 3.0 | 2.5 | 2.5 | 2.8 | 4.4 | 3.0 |
| | Tm(° C.) | 125.8 | 125.8 | 125.8 | 122.2 | 123.5 | 122.5 | 123.0 | 123.0 | 125.8 |
| | Wt. % | 12.3 | 9.8 | 16.4 | 7.4 | 10.7 | 13.1 | 8.2 | 9.0 | 16.4 |
| Second PE | Mw | $5.6 \times 10^5$ | $5.6 \times 10^5$ | $5.6 \times 10^5$ | $5.6 \times 10^5$ | $5.6 \times 10^5$ | $5.6 \times 10^5$ | $5.6 \times 10^5$ | $7.5 \times 10^5$ | $5.6 \times 10^5$ |
| | Mw/Mn | 4.1 | 4.1 | 4.1 | 4.1 | 4.1 | 4.1 | 4.1 | 11.9 | 4.1 |
| | Wt. % | 69.7 | 72.2 | 65.6 | 69.7 | 71.3 | 68.9 | 73.8 | 73.0 | 65.6 |
| Third PE | Mw | $1.95 \times 10^6$ | $1.95 \times 10^6$ | $1.95 \times 10^6$ | $1.95 \times 10^6$ | $1.95 \times 10^6$ | $1.95 \times 10^6$ | $1.95 \times 10^6$ | $1.95 \times 10^6$ | $1.95 \times 10^6$ |
| | Mw/Mn | 5.1 | 5.1 | 5.1 | 5.1 | 5.1 | 5.1 | 5.1 | 5.1 | 5.1 |
| | Wt. % | 18 | 18 | 18 | 18 | 18 | 18 | 18 | 18 | 18 |
| Production Conditions | | | | | | | | | | |
| PE Concentration (wt. % in Melt Blend | | 25 | 25 | 25 | 25 | 25 | 25 | 25 | 25 | 25 |
| Stretching | | | | | | | | | | |
| Temperature (° C.) | | 115 | 115 | 115 | 115 | 115 | 115 | 115 | 115 | 115 |
| Magnification (MD × TD)[(4)] | | 5 × 5 | 5 × 5 | 5 × 5 | 5 × 5 | 5 × 5 | 5 × 5 | 5 × 5 | 5 × 5 | 5 × 5 |
| Dry Orientation | | | | | | | | | | |
| Temperature (° C.) | | — | — | — | — | — | — | — | — | 115 |
| Magnification (TD) | | — | — | — | — | — | — | — | — | 1.2 |
| Heat Setting | | | | | | | | | | |
| Temperature (° C.) | | 115 | 115 | 115 | 115 | 115 | 115 | 115 | 115 | 115 |
| Time (minute) | | 10 | 10 | 10 | 10 | 10 | 10 | 10 | 10 | 10 |
| Properties | | | | | | | | | | |
| Average Thickness (μm) | | 19.1 | 20.1 | 19.8 | 20.0 | 20.1 | 20.1 | 20.5 | 20.1 | 18.7 |
| Porosity (%) | | 48.3 | 48.7 | 47.5 | 40.6 | 46.6 | 42.2 | 45.4 | 38.5 | 51.4 |
| Normalized Air Permeability (sec/100 cm$^3$/20 μm) | | 238 | 234 | 242 | 460 | 339 | 452 | 358 | 452 | 203 |
| Shutdown Temperature (° C.) | | 128.7 | 129.8 | 127.1 | 127.0 | 128.5 | 128.5 | 129.4 | 128.0 | 127.9 |

TABLE 1-continued

| | | Comparative Example 1 | Comparative Example 2 | Comparative Example 3 | Comparative Example 4 | Comparative Example 5 |
|---|---|---|---|---|---|---|
| Resin Composition | | | | | | |
| PE Composition | | | | | | |
| First PE | Mw | — | $2.1 \times 10^5$ | $7.5 \times 10^5$ | $7.5 \times 10^5$ | $1.7 \times 10^5$ |
| | Mw/Mn | — | 3.2 | 3.6 | 3.6 | 3.0 |
| | Tm(° C.) | — | 98.0 | 120.0 | 120.0 | 130.4 |
| | Wt. % | — | 16.4 | 8.2 | 14.8 | 17.0 |
| Second PE | Mw | $5.6 \times 10^5$ | $5.6 \times 10^5$ | $5.6 \times 10^5$ | $5.6 \times 10^5$ | $5.6 \times 10^5$ |
| | Mw/Mn | 4.1 | 4.1 | 4.1 | 4.1 | 4.1 |
| | Wt. % | 82 | 65.6 | 73.8 | 67.2 | 65.0 |
| Third PE | Mw | $1.95 \times 10^6$ | $1.95 \times 10^6$ | $1.95 \times 106$ | $1.95 \times 10^6$ | $1.95 \times 10^6$ |
| | Mw/Mn | 5.1 | 5.1 | 5.1 | 5.1 | 5.1 |
| | Wt. % | 18 | 18 | 18 | 18 | 18 |
| Production Conditions | | | | | | |
| PE Concentration (wt. %) in Melt Blend | | 25 | 25 | 25 | 25 | 25 |
| Stretching | | | | | | |
| Temperature (° C.) | | 115 | 110 | 115 | 115 | 115 |
| Magnification (MD × TD)[1] | | 5 × 5 | 5 × 5 | 5 × 5 | 5 × 5 | 5 × 5 |
| Dry Orientation | | | | | | |
| Temperature (° C.) | | — | — | — | — | — |
| Magnification (TD) | | — | — | — | — | — |
| Heat Setting | | | | | | |
| Temperature (° C.) | | 115 | 90 | 115 | 115 | 115 |
| Time (minute) | | 10 | 10 | 10 | 10 | 10 |
| Properties | | | | | | |
| Average Thickness (μm) | | 21.0 | 20.1 | 20.2 | 19.7 | 12.2 |
| Porosity (%) | | 47.0 | 45.8 | 41.0 | 37.7 | 38.4 |
| Normalized Air Permeability (sec/100 cm³/20 μm) | | 212 | 880 | 481 | 619 | 388 |
| Shutdown Temperature (° C.) | | 132.6 | 122.6 | 131.6 | 130 | 131.6 |

Note:
[1]MD represents machine direction and TD represents transverse direction.

What is claimed is:

1. A microporous membrane comprising a mixture of polyolefin, the mixture of polyolefin consisting essentially of a first polyethylene, a second polyethylene having a Tm ≥131.0° C. and an Mw of $5.6 \times 10^5$ to $7.5 \times 10^5$, a third polyethylene having an Mw >$1.0 \times 10^6$, and polypropylene, wherein 1) the first polyethylene is a copolymer of ethylene and a comonomer which is selected from the group consisting of butene-1, pentene-1, hexane-1, 4-methyl-pentene-1, octane-1, vinyl acetate, methyl methacrylate and styrene, 2) the first polyethylene has a Mw of $3.8 \times 10^4$ to $2.6 \times 10^5$, a molecular weight distribution of from 1.8 to 3.5 and a Tm of 123.0° C. to 126.0° C., 3) the second polyethylene and the third polyethylene are ethylene homopolymer, 4) an amount of the polypropylene is <5.0 wt. %, based on the weight of the polymer used to produce the microporous membrane and 5) the microporous membrane has a normalized air permeability of $1.0 \times 10^2$ seconds/100 cm³/20 μm to $3.58 \times 10^2$ seconds/100 cm³/20 μm.

2. The microporous membrane according to claim 1, wherein the membrane has a shutdown temperature ≤130.5° C.

3. The microporous membrane according to claim 1, wherein the first polyethylene is present in an amount of 4.0 wt. % to 20.0 wt. %, based on the total weight of polymer in the polymer-diluent mixture.

4. The microporous membrane according to claim 1, wherein the second polyethylene is present in an amount of 50.0 wt. % to 95.0 wt. %, based on the total weight of polymer in the polymer-diluent mixture, and the third polyethylene is present in an amount of 1.0 wt. % to 46.0 wt. %, based on the total weight of polymer in the polymer-diluent mixture.

5. A battery separator film comprising the microporous membrane of claim 1.

6. A battery comprising an electrolyte, an anode, a cathode, and a separator situated between the anode and the cathode, wherein the separator comprises the microporous membrane of claim 1.

7. A method of producing a microporous membrane, comprising:
(1) extruding a mixture of diluent and polymer, the polymer consisting essentially of a first polyethylene, a second polyethylene having a Tm ≥131.0° C. and an Mw of $5.6 \times 10^5$ to $7.5 \times 10^5$, a third polyethylene having an Mw >$1.0 \times 10^6$, and polypropylene, wherein 1) the first polyethylene is a copolymer of ethylene and a commoner which is selected from the group consisting of butene-1, pentene-1, hexane-1, 4-methyl-pentene-1, octane-1, vinyl acetate, methyl methacrylate and styrene, 2) the first polyethylene has a Mw of $3.8 \times 10^4$ to $2.6 \times 10^5$, a molecular weight distribution of from 1.8 to 3.5 and a Tm of 123.0° C. to 126.0° C., 3) the second polyethylene and the third polyethylene are ethylene homopolymer, and 4) an amount of the polypropylene is <5.0 wt. %, based on the weight of the polymer used to produce the microporous membrane;

(2) stretching the extrudate in at least one planar direction; and (3) removing at least a portion of the diluent from the stretched extrudate to form the microporous membrane which has a normalized air permeability of $1.0 \times 10^2$ seconds/100 cm$^3$/20 μm to $3.58 \times 10^2$ seconds/100 cm$^3$/20 μm and a shutdown temperature ≤130.5° C.

8. The method of claim 7, wherein the first polyethylene is present in an amount of 4.0 wt. % to 17.0 wt. %, based on the weight of the polymer in the polymer-diluent mixture, the second polyethylene is present in an amount of 50.0 wt. % to 95.0 wt. %, based on the weight of the polymer in the polymer-diluent mixture, and the third polyethylene is present in an amount of 1.0 wt. % to 46.0 wt. %, based on the weight of the polymer in the polymer-diluent mixture.

9. A membrane product of the method of claim 7.

* * * * *